BAR CODE ENCODING AND INFORMATION RETRIEVAL

Filed Feb. 25, 1969 2 Sheets-Sheet 1

DM = DICHROIC MIRROR
F = INTERFERENCE FILTER
D = DETECTOR

INVENTOR.
FREDERICK HALVERSON

BY

Samuel Branch Walker

ATTORNEY

BAR CODE ENCODING AND INFORMATION RETRIEVAL

Filed Feb. 25, 1969 2 Sheets-Sheet 2

INVENTOR.
FREDERICK HALVERSON
BY
Samuel Branch Walker
ATTORNEY

United States Patent Office 3,492,660

Patented Jan. 27, 1970

3,492,660

BAR CODE ENCODING AND INFORMATION RETRIEVAL

Frederick Halverson, Stamford, Conn., assignor to American Cyanamid Company, Stamford, Conn., a corporation of Maine Continuation-in-part of application Ser. No. 666,103, Sept. 7, 1967. This application Feb. 25, 1969, Ser. No. 805,986

Int. Cl. G11b 7/00, 9/00

U.S. Cl. 340—173 7 Claims

ABSTRACT OF THE DISCLOSURE

A bar code is formed of bars of different photoluminescent materials instead of a single color as in standard bar codes, the bars of each coding component being uniformly spaced and sufficiently displaced so that there will be no total overlap at any point of bars of all of the different components. The encoded message on a substrate is moved, preferably at a uniform rate, past sensors which respond respectively to the different luminescence of the different components, the substrate of course being exposed to ultraviolet illumination of suitable wavelength or wavelength range and producing photoluminescence of the different components. Signals from detectors responding to each of the luminescence colors are transmitted in separate channels with, of course, the phase difference of the spacing of each type of coding bar. The signal can then be interpreted in a fashion similar to known bar code retrieval techniques. The use of a number of different photoluminescent bars increases the amount of information which can be encoded in a given length of substrate and so increases the capacity of the system without affecting its reliability, which is the same as that of a standard bar code of a single color. Clusters of different photoluminescent bars can also be used and reduce stability requirements on the clocking necessary for a standard bar code of a single color.

RELATED APLICATIONS

This application is a continuation-in-part of my application Ser. No. 666,103, filed Sept. 7, 1967, and now abandoned.

BACKGROUND OF THE INVENTION

Photoluminescent bar codes are a well known form of encoding information for machine retrieval, a typical example being described in T. Pilling and P. Horrocks, Post Office Electrical Engineering Journal (England), volume 54, pp. 122–129 (July 1961). The code depends on presence or absence of bars of a single luminescing material in predetermined spaces. Readout produces an electrical signal having a series of pulses related to the presence or absence of bars constituting the coding of the message. The readout mechanism is provided with starting position signals to set the signal phase when the substrate on which the message is encoded is moved past the reader. The shape of the so-called bars is not critical; for good optical resolutions they are usually narrow, rectangular bars of modest height, for example of the order of 2 mm. It is not necessary, however, that the bars be of exact rectangular shape, and any other suitable shape may be used. However, as the system usually uses narrow, rectangular bars, it is referred to as a bar code regardless of the exact shape of the bars, and this somewhat broader interpretation of language will be followed throughout the present specification.

In spite of the general utility of standard bar codes, there have been certain drawbacks. Bars have to be spaced sufficiently far apart to allow satisfactory optical resolution by the reading mechanism, thereby permitting readily identifiable electrical signals. In order to provide a satisfactory depth of field for substrate positioning and a reasonable safety margin, the bar location usually involves spacings which are larger than the minimum distance which might function under optimum operating conditions. The net result is to reduce that fraction of the substrate surface covered by the sequence of bars which actually is used to generate information pulses. This limits the amount of information which can be encoded into a series of bars along a given length of substrate, subject to practical requirements on reliability under operating conditions.

SUMMARY OF THE INVENTION

The present invention greatly increases the amount of information which can be encoded in bar code form in a given substrate length and, correspondingly, increases the practical rate at which information can be retrieved. Essentially the present invention utilizes two or more photoluminescent materials which luminesce in physically distinguishable wavelength bands, forming one series of bars, or marks, with one photoluminescent material, a second series of bars with the second photoluminescent material, and so forth. Each series of bars of a particular component has essentially the same basic spacing between marking areas but a given series of bars is displaced slightly relative to other series along the direction of the gap between marking areas. The term marking area is used to designate the location in a given series at which presence or absence of a bar is a part of the code. During readout, each series of bars develops its own set of code pulses largely independent of the other series present, and these are readily identified by the introduction of chromatic resolution into the readout apparatus, which isolates pulses from a given series into its output channel. The basic pulse repetition rate is substantially the same in each channel, but there is a phase difference between channels, related to the geometric displacement of one series relative to another on the substrate.

The displacement of bars of one photoluminescent component into the gap between bars of another component allows utilization of substrate space which cannot be used for signal generation when a single component is used. It is the superposition of chromatic resolution, along with photoluminescent components having appropriate luminescence characteristics, onto the standard bar code spacing requirements for geometrical optical resolution, which allows the increased information density of the present invention. It will be noted that there is an overlapping of one series of bars, that is a series of bars of a particular component, with at least one other series of bars, that is a series of bars of a different photoluminescent component. In other words, two adjacent marking areas of one series will have a marking area from at least one, and usually more than one, other series located someplace between them. The displacement of bars, or marking areas, of one photoluminescent component into the gap between bars of another component may be only a partial displacement, by less than the width of a marking area, so that individual marking areas for the two series exhibit appreciable overlap. On the other hand, the displacement may be comparable to the width of a marking area, so that there is little or no overlap between individual marking areas for the two series. The smaller displacement of marking areas, however, allows use of more series of photoluminescent components and hence maximum information density per unit length of substrate. It is worthwhile noting again at this point that the geometrical optical resolution required for the reader is determined by the size and spacing of marking areas within a given series, and is substantially independent of the shift of one series relative to another.

The broad ideal of using narrow-band photoluminescent material in codes is described and claimed in the co-pending application of Freeman and Halverson, Ser. No. 596,366, filed Oct. 14, 1966, which is a continuation-in-part of a prior application, Ser. No. 437,866, filed Mar. 8, 1965, and now abandoned, both applications being assigned to the assignee of the present application. In the Freeman and Halverson application, a number of photoluminescent materials constitute the components of the code, which is determined by the presence or absence of particular components in a given symbol or marking space. The code permits a choice of symbols which is $2^n-1$, wherein $n$ is the number of components. In other words,, four components permit 15 symbols, six components 63, etc. All of the coding components corresponding to a particular symbol are imprinted in the same marking space eother by separate component printing or by imprinting in inks having the proper mixture of components. In order to have sharply separated photoluminescent bands, the Freeman and Halverson application prefers to use, for at least some of its components, narrow band luminescers such as complexes of lanthanide ions having an atomic number greater than 57. The Freeman and Halverson code is not a bar code, proceeds by different encoding methods and somewhat different readout methods, and does not have certain of the advantages of the overlapping bar code.

In the co-pending application of Merrell, Ser. No. 662,-657, filed Aug. 23, 1967, assigned to the assignee of the present invention, the Freeman and Halverson code is spread over a number of marking areas corresponding to the number of components in the code, which permits a simpler marking process, but it is not a bar code and does not have certain advantages inherent in this type of code.

The present invention uses photoluminescent materials of the types described in the Freeman and Halverson application, which allow straight forward spectral separation of luminescence from individual components with a minimum of interference. It should be noted that bars of different photoluminescent components may overlap to some extent, but in general the different series of bars are positioned so as to make best use of the length of substrate avalable for bar coding. Since the photoluminescent components are present as very thin films or dots in the marks, they should be strong absorbers of exciting radiation in order to generate adequate luminescence signals. If the overlapping of individual marks in the several series of marks is complete, as in the Freeman and Halverson, and the Merrell codes, there is competition between the components for exciting radiation which frequently can be serious. Indeed, in an extreme case, if six photoluminescent components are used, and if six relatively dense marks were built up on top of preceding ones in sequence, the uppermost marks could absorb essentially all of the exciting radiation, so that little or no luminescence from the lowest mark would be observed. In the present invention, however, this masking effect is avoided, or at least minimized, by displacing each series of marks with respect to the rest.

For example, using six photoluminescent components, suppose marks or bars for each component have a width W, with a gap 2W between marking locations. The first series of bars is printed, with one component, in the available substrate space, starting as far to the left as practicable. The second series of bars is displaced a distance 0.5W to the right with respect to the first series, the third series a distance 0.5W to the right with respect to the second series, and so forth. Then each series of marks has a minimum of 0.5 of each marking area exposed to exciting radiation as the top surface, and no area of the substrate has more than two components deposited on it. This scheme provides for very efficient utilization of exciting radiation for all components. The example cited is for illustrative purposes only, and greater or less overlap of marking areas can be tolerated so long as the photoluminescence generated is adequate for reliable detection. In this example, the amount of information which can be encoded in a line of length L with the six photoluminescent components is essentially six times that which would have been encoded with one component, and the extra space required is $\sim 2.5W$. Since usually $W \ll L$, this additional space is negligible in comparison with L.

Although maximum information density can be obtained by overlapping the different adjacent photoluminescent bars as much as is practical while still retaining reliability, there are situations where this high information density is not required and other advantages accrue from reduction of overlap. Thus, in cases where accurate clocking is difficult, leaving a relatively larger gap between groups or clusters of photoluminescent bars will be shown to provide a simple answer to the problem. Such a variant will be described in conjunction with some of the figures in the drawings in the description of the specific embodiments.

It should be noted that the path over which bars, or marks, are printed need not be a straight line, but it is necessary, of course, that the readout apparatus follow the appropriate path. For purposes of clarity the discussion has been, and will continue to be, limited to a single line of marking areas, but it is obvious that the invention is equally applicable to multiple lines of marking areas.

Also, it is not essential that the substrate carrying the message be moved past the reading station at a constant speed, but as with all bar codes some type of timing clock correlated with substrate motion, or with localized substrate reading area, is necessary. One type of applicable clock is described in the Pilling and Horrocks article referred to above.

It will be noted that it is only necessary that there be relative motion between the image of the localized substrate area and the reading head. This can be effected as described above by maintaining the head stationary and moving the substrate. On the other hand, the substrate may be stopped and the image of a localized area scanned across the reading head, either by physically moving of the head or one of its optical elements, such as a mirror. Both forms of relative motion may, of course, be combined.

In the preferred type of readout system, as will be described subsequently, there is a single reading station for a given line of marking areas, but the invention is not limited to this type of readout. There may even be a separate reading station for each set of marking areas, that is, for each different photoluminescent component. Since multiple reading stations are perforce separated, they place a slightly stronger requirement on the characteristics of the timing clock. Readout may occur simultaneously with shortwave illumination or it may occur after a short delay, which can be used to distinguish photoluminescers such as complexes of lanthanide ions with luminescent decay periods of a number of microseconds from organic fluorescers such as optical brighteners, which decay is very small fractions of a microsecond.

In all bar codes there has to be a synchronizing signal which starts when the first bar, or the space where the bar would be if the code required one, starts. This is needed, of course, in the present invention also, but it is not necessary to have multiple signals as the start of the first bar or its position as the first of the sets is sufficient since the others are synchronized therewith automatically. In other words, here again the advantages of the present invention are obtained without any significant drawbacks. Of course the necessary signal processing during readout is not significantly changed by the present invention, which is an added advantage as standard equipment may be used.

DESCRIPTION OF THE PREFERRED EMBODIMENT

Figure 1:
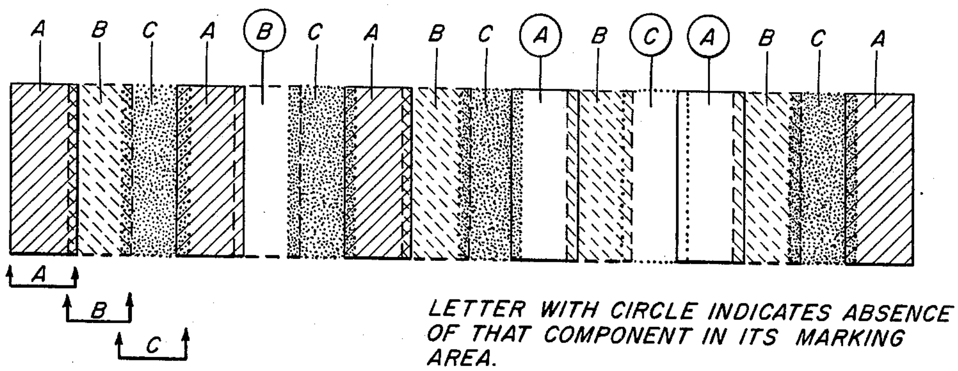
FIG. 1 illustrates a message encoded on a substrate in bars of three photoluminescent components A, B, and C. Where the code requires the absence of a bar, this is indicated by a blank space and by circling of the letter in the figure.

FIG. 1 shows a bar code with bars in three photoluminescent components A, B, and C, the spacing being uniform but being somewhat displaced, resulting in maximum overlapping areas of less than 50%. The different components are labeled with the letters and bear different representations, A being solid cross-hatching, B dashed cross-hatching, and C dotted. Wherever there is a particular bar missing in accordance with the code, the letter is circled, and the drawing shows the white background without any cross-hatching.

While it is not intended to limit the present invention to any particular photoluminescent components, an example which would be typical would have A represent yttrium vanadate doped with dysprosium at the 0.6 mole percent level, B represent the tris chelate of europium with 1,1,1,2,2-pentafluorohepta-3,5-dione and trioctyl phosphine oxide as a synergic agent, and C represent yttrium vanadate doped with samarium at the 0.6 mole percent level.

FIGURE 1 shows rectangular bars, the preferred shape for bar codes, but of course they can be of any other suitable shape and need not be in a straight line, a curved path being usable so long as the same path is followed in readout. However, as rectangular bars are simple and a straight line is readily achieved, this constitutes a prefered form.

Figure 2:
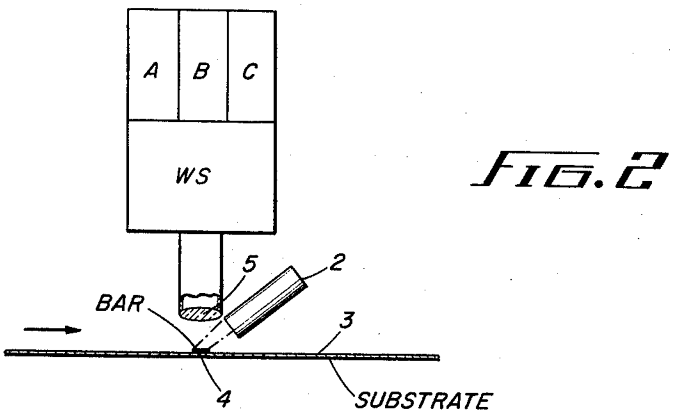
FIG. 2 is a block diagram of a readout mechanism.

FIG. 2 shows a block diagram of the readout. The ultraviolet lamp is shown at 2 with the moving substrate at 3. The lamp is shown illuminating a single bar, or the space of a single bar, but of course in practice the substrate would have a large number of bars in sequence constituting the code, and the lamp could illuminate a number of bars. Similarly, the bar 4 is shown of enormously exaggerated thickness; actually, of course, it is substantially flush with the substrate. The luminescing bar 4 is imaged by lens 5 onto the entrance of a unit designated as a wavelength selector WS. The wavelength selector is combined with three photodetectors sensitive to radiation at appropriate wavelengths to provide outputs labeled A, B, and C, which are responsive to the presence of A, B, or C in a mark at 4.

Figure 3:
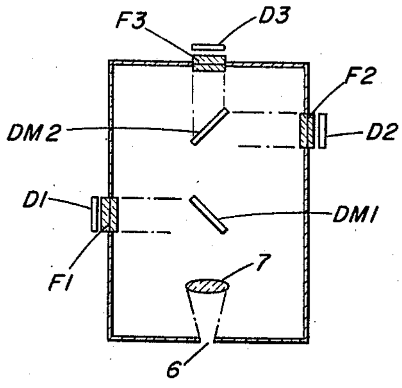
FIG. 3 is a diagrammatic showing of one type of wavelength selector.

FIGURE 3 shows the structure of a typical wavelength selector, together with location of the photodetectors. Radiation enters through a slit 6 which has an aperture allowing geometrical resolution of a single mark, or of areas between marks, for a given luminescent component, and the lens 7 essentially collimates radiation which enters through the slit 6. Separation of the entering beam both spatially and chromatically is effected by two dichroic mirrors designated DM–1 and DM–2. The identifying luminescence wavelength of component A is reflected by DM–1, while the other luminescence wavelengths are transmitted; the identifying luminescence wavelength of component B reflected by DM–2, while the luminescence wavelength of component C is transmitted. The three interference filters F–1, F–2, and F–3 transmit the identifying photoluminescence wavelength bands of components A, B, and C respectively, and block the transmission of radiation of other wavelengths which may be impinging on them.

While FIGURE 3 represents a typical wavelength selector, other designs may be used. Chromatic beam splitting by dichroic mirrors is more efficient with respect to radiant energy than achromatic beam splitting but where there is sufficient energy the latter is not excluded.

The detectors shown diagrammatically in FIGURE 3 as D–1, D–2, and D–3 are transducers for converting radiant energy into electrical signals. These may be standard photodetectors, such as photomultiplier tubes, but they must be selected to be responsive to radiation of the wavelengths transmitted by the corresponding interference filters F–1, F–2 and F–3.

The electronic circuits which process signals from the individual photodetectors of the variant shown in FIGS. 1 to 3 are often essentially of the same type as those used for standard bar codes and so are not described in detail. It is clear, of course, that in the read out diagrammed in FIG. 2 there are three signal channels instead of the usual single one with a standard bar code using only a single colored component.

Figure 4:
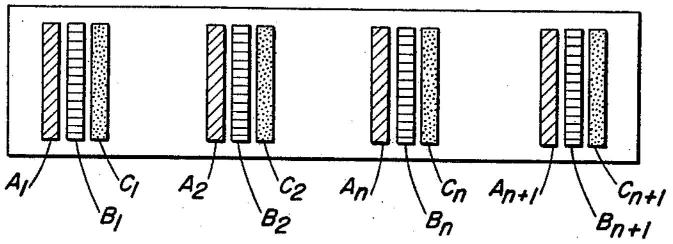
FIG. 4 illustrates three series of marking areas, with four marking areas in each series, and with marking areas arranged in groups to simplify clocking.

FIG. 4 shows a variant with an arrangement of marking areas for three different photoluminescent components, which, as is the case with FIG. 1, are designated as A, B, C. Different marking areas in a given series are denoted by subscripts. The illustration in FIG. 4 shows corresponding marking areas of the different series grouped together or clustered, as contrasted with the uniform distribtuion over space shown in FIG. 1. All marking areas in a cluster thus have the same subscript, and so the subscript also can be used to designate a particular cluster. Two adjacent clusters can be indicated by the subscripts $n$ and $n+1$, where $n$ may have the value 1, 2, or 3, in relationship to FIGURE 4. The spacing between adjacent clusters is larger than the linear distance spanned by the optical geometric resolution of the readout apparatus, that is the spacing between marking areas $C_n$ and $A_{n+1}$ is large enough so that the readout apparatus cannot sense both marking areas simultaneously. Although the marking areas from different series within a given cluster in FIGURE 4 are sketched as displaced sufficiently to avoid any geographical overlaps with each other, this is not a requirement.

While the arrangement of marking areas sketched in FIGURE 4 can be coded and read in the same manner as the arrangement in FIGURE 1, there is a variant which greatly relaxes the usual clocking requirement for bar code readout. In this variant, a condition imposed on the code is that each cluster of marking areas in FIGURE 4 contains a photoluminescent component in at least one of its marking areas. The first component sensed in a cluster then provides a time scale during which any other component in the same cluster must be sensed, thus providing a kind of internal clock. This scheme reduces the precision needed for synchronization of substrate motion relative to the reading station, lowers accuracy required for spacing between marking areas in a given series, and replaces it by a much looser requirement on spacing between clusters of marking areas. Indeed, if the spacing betwen clusters is made larger than linear space spanned by a cluster, the usual requirement for equal spacing between marking areas in a given series can be relaxed to the point where permutations of marking area locations within a cluster can occur. For example, the first cluster might have the sequence $A_1B_1C_1$, and the second cluster might have the sequence $B_2A_2C_2$. All that is needed is that variations in relative motion of the substrate with respect to the reading station be small during the time associated with one cluster and its adjacent gap.

The bar code scheme just described may be illustrated by markings on a label attached to a parcel, which may move on a conveyor system past the readout mechanism. While the unloaded conveyor motion may be relatively smooth, in practical operation a loaded conveyor may exhibit slight surges which make close synchronization between linear motion and time impractical for clocking. The marking system illustrated in FIG. 4 permits rather large fluctuations in linear motion without interfering with the clocking when the requirement that each grouping of marking areas with the same subscript contain at least one photoluminescent bar is imposed and when the signals are analyzed by a particular logic scheme which will be described below. Needless to say, the particular photoluminescent components usable may be the same as those described in connection with FIG. 1, but the invention is not limited to these particular components.

Figure 5:
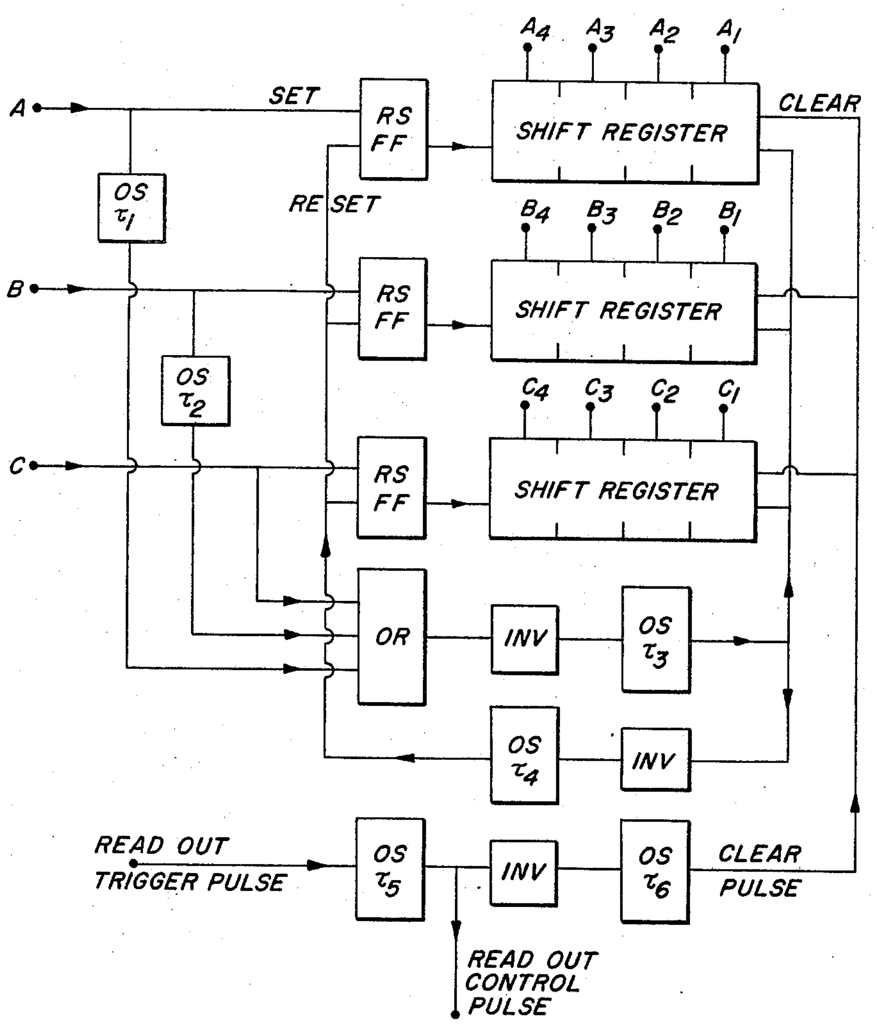
FIG. 5 is a schematic and block diagram representation of the logic circuit elements which can be used with the code system of FIG. 4.

FIG. 5 is a symbolic representation or block diagram schematic of one set of logic circuit elements which can operate on signals from the three wavelength channels of FIG. 2 in order to sort them into binary outputs for the twelve marking areas illustrated in FIG. 4. The electrical signals from photodetectors in FIG. 2 are assumed to have been subjected to known signal processing techniques whereby a fixed voltage is generated whenever the optical signal in the channel exceeds some preset threshold value and otherwise is at ground potential. These processing techniques which produce shaped electrical pulses are not by themselves, as individual techniques, new in the electronic art, and therefore, no particular circuit is illustrated in detail. The shaped electrical pulses have inputs at the terminals labeled A, B, and C respectively in FIG. 5.

When a pulse appears at A, it sets the top flip-flop, designated RSFF, so that its output corresponds to logic state "1." The information is stored in the top RSFF until a reset pulse is provided to return it to the logic "0" state. Similar statements apply to the RSFF units associated with inputs B and C.

The pulse appearing at input A also triggers a one-shot multivibrator, abbreviated $OS\tau_1$, which generates a voltage pulse of magnitude appropriate to the logic elements in use and of duration $\tau_1$. This duration is at least as long as the duration of the input signal pulse, and its selection will be described below.

Similar statements apply to a pulse appearing at input B, but here the one-shot multivibrator is designated $OS\tau_2$ and the duration, of course, is for $\tau_2$, which, however, may be the same as $\tau_1$, though this is not essential and usually $\tau_2$ will be shorter than $\tau_1$.

Let us suppose that the parcel with the markings shown in FIG. 4 on it, or on a label attached to it, passes the readout mechanism as described above. The optical system senses marking area $A_1$ first, then marking area $B_1$, followed by marking area $C_1$. It may still be sensing area $A_1$ when it starts sensing area $B_1$, and in some cases, but not necessarily, when it starts sensing $C_1$. In any event, the geometric spacing between marking area $C_1$ and marking area $A_2$ is large enough so that the readout mechanism no longer senses area $C_1$ when it starts sensing area $A_2$. In practice there should be a slight time delay between the time when the readout mechanism completes sensing marking area $C_1$ and the time when it begins to sense marking area $A_2$. Similar comments apply to all of the spacings between marking area $C_n$ and $A_{n+1}$, which is why the more general notation is used.

If component A is present in marking area $A_1$, a pulse appears at input A in FIG. 5. The top RSFF is set in state 1 and the OS with duration $\tau_1$ is triggered. The magnitude of $\tau_1$ is chosen so that the pulse lasts until the readout mechanism is sensing marking area $C_1$.

If component B is present in marking area $B_1$, a pulse appears at input B in FIG. 5, and the corresponding RSFF is set to state 1 and OS with duration $\tau_2$ is triggered. The magnitude of $\tau_2$ is chosen so that the pulse lasts until the readout mechanism is sensing marking area $C_1$. $\tau_2$ will often be smaller than $\tau_1$, although this is not essential so long as $\tau_2$ is short enough so that the pulse terminates some time before the readout mechanism starts sensing marking area $A_2$.

If component C is present in the marking area $C_1$, a pulse appears at input C in FIG. 5, and its RSFF is set to state 1. This pulse together with the pulses of $OS\tau_1$ and $OS\tau_2$, if they are present, are all connected to logic element OR, which performs the OR logic function. In other words, while any of these pulses is present the output from the OR element is in the upper state, or logic 1 state, and reverts to the lower state, or logic 0 state, when no pulse is present at its input.

Taking into account the direction of motion of the parcel, magnitudes of $\tau_1$ and $\tau_2$ for the two OS units, and the requirement that at least one photoluminescent component appear within a cluster, the output from the OR element will rise to its upper state when the first photoluminescent component present in a cluster is sensed, regardless of whether this is caused by component A, B or C. The output will remain at its upper state until the last photoluminescent component present in the cluster has been sensed and then will return to its lower state before any marking area in the next cluster is sensed. The behavior of the output from the OR element, and in particular return from the upper to the lower state, can be used as a timing signal that all marking areas within the cluster have been sensed. Thus the external clocking need only involve motion of the substrate over the linear distance covered by a cluster and not over the distance covered by the entire bar code. It is relatively easy to accommodate wide fluctuations in velocity of parcel relative to readout apparatus without affecting accurate reading of the label.

The change of the OR element output from upper to lower state, which signals the end of sensing photoluminescent components in a cluster, is inverted by an inverting circuit of conventional design, marked INV, and this triggers an OS unit providing an output pulse with a duration $\tau_3$. This pulse does two things: namely, it provides a shift input pulse to three 4-bit shift registers, which appear on the drawing, and it initiates a delayed pulse with a duration $\tau_4$. The shift pulse to the shift registers causes them to shift binary information from one stage to the next, and to read in binary information from the RSFF units into the first stages. The delayed pulse, of duration $\tau_4$, starts at the end of the shift pulse, and resets all three RSFF units to the logic 0 state to be ready to receive information from the next marking area sensed. Of course the sum of the pulse durations $\tau_3$ and $\tau_4$ must not exceed the minimum possible delay between the termination of sensing marking area $C_n$ and the start of sensing marking area $A_{n+1}$.

As the parcel continues to move, the next cluster of marking area comes before the readout mechanism and is sensed. The pulses in this cluster, of course, actuate the logic elements in FIG. 5 in exactly the same manner as has been described, but, as at the end of any cluster there has been a pulse applied to the shift registers, each will have shifted one stage. As the parcel moves away from the readout apparatus, it trips an edge detector which provides a readout trigger pulse, shown on FIG. 5. This pulse activates an $OS\tau_5$ unit which, in turn, activates a control system for using the information contained on the label. At the end of the pulse of duration $\tau_5$, an inverter applies a positive pulse to an $OS\tau_6$ unit, which generates a pulse which clears the shift registers to be ready for reading the label on the next parcel.

The particular arrangement of logic circuit elements in FIG. 5 and the particular arrangement of clusters in FIG. 4 is typical and illustrates one satisfactory embodiment of the invention. Of course other arrangements of clusters and logic circuit elements may be used, and the invention is not limited to the particular illustration.

In the claims the term "bar" is used in accordance with its usual meaning in bar code terminology, to cover a geometric area of predetermined size and shape. This broader meaning is used in the present application and it is not intended to be limited to bars of purely rectangular shape. Also, as the present invention may operate with as little as two sets of photoluminescent bars, the term "plurality" will be used to designate more than one and not in the restricted sense in which it is sometimes use, to designate more than two.

I claim:

1. A process for the encoding and retrieval of information by a bar code involving overlapping at least of portions of the code, which comprises (a) depositing a photoluminescent component in at least some marking areas of each of a plurality of sets of marking areas on a substrate, the photoluminescent component being different in each set, and each photoluminescent component on illumination with short wavelength radiation luminescing in at least one wavelength band substantially different from that of any other photoluminescent component use, (b) the sets being located on substantially the same area of substrate but displaced relative to each other in the direction of the gap between marking areas, this displacement being sufficient to allow substantially equivalent exposure of all photoluminescent components to exciting radiation, (c) illuminating at least one marking area of a set on the substrate with shortwave radiation which causes bars to luminesce with their characteristic wavelength, isolating the luminescence from essentially no more than one marking area within a given set, reading the luminescence with a reading head, producing relative motion between the image of a single marking area and the reading head, and converting luminescence from each photoluminescent component into separate electrical signals.

2. A process according to claim 1 in which the marking areas are narrow, rectangular bars and are spaced apart in each set by a distance at least equal to the bar width.

3. A process according to claim 2 in which there is a partial overlap of marking areas from one set over those from another and in which the overlap does not exceed 50%.

4. A process according to claim 1 in which at least one of the photoluminescent components is a complex of a lanthanide ion of atomic number greater than 57.

5. A process according to claim 2 in which at least one of the components is a complex of a lanthanide ion of atomic number greater than 57.

6. A process according to claim 1 in which marking areas from different sets are grouped together in clusters, each cluster consisting of marking areas equal to the number of sets, with a spacing between the clusters at least sufficient so that when the reading head is sensing luminescence from the first marking area of the next cluster it no longer senses from the last marking area of the preceding cluster, and at least one marking area in each cluster contains a photoluminescent component.

7. A process according to claim 6 in which at least one of the components is a complex of a lanthanide ion of atomic number greater than 57.

References Cited

UNITED STATES PATENTS 3,403,387 9/1968 Boblett -------------- 340—73

TERRELL W. FEARS, Primary Examiner

U.S. Cl. X.R.

350—160